UNITED STATES PATENT OFFICE 2,650,876

BIOLOGICALLY ACTIVE COMPOSITIONS

William D. Stewart, Brecksville, Ohio, assignor to The B. F. Goodrich Company, New York, N. Y., a corporation of New York No Drawing. Application February 1, 1950, Serial No. 141,857

7 Claims. (Cl. 71—2.7)

This invention relates to biologically-active compositions which are useful in pesticidal applications as in combating insects, fungi and bacteria and which are also useful plant growth stimulants. More specifically the invention pertains to compositions containing as their essential biologically-active ingredient an O-alkyl thiocarbamate, and to the use of these compositions for pesticidal and plant-growth-regulating purposes.

I have discovered that O-alkyl thiocarbamates possess unique biological activity in that they function quite effectively as active ingredients in fungicidal compositions, insecticidal compositions, and plant growth stimulating compositions.

The O-alkyl thiocarbamates are chemical compounds having the general formula

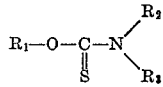

wherein $R_1$ is an alkyl group and

represents the radical derived by removing a reactive hydrogen atom from ammonia or an amine having at least one hydrogen connected to the amino nitrogen. They can be easily and conveniently prepared by reacting a metal salt of a xanthogenic acid with a haloamine, or by reacting ammonia or an amine with a bis-xanthogen, or by oxidizing an amine salt of a xanthogenic acid with hypochlorous acid or sodium hypochlorite. The

portion of the general formula of the O-alkyl thiocarbamate is derived from ammonia or the amine (or haloamine) used in its preparation. In the case where ammonia is reacted with a bisxanthogen, both $R_2$ and $R_3$ in the resulting O-alkyl thiocarbamate represent hydrogen atoms. When an amine or haloamine or amine salt is used to prepare the O-alkyl thiocarbamate, one of $R_2$ and $R_3$ may be hydrogen and the other a hydrocarbon radical, or both may be hydrocarbon radicals depending, of course, on whether the original amine, haloamine or amine salt is primary or secondary. When both $R_2$ and $R_3$ are hydrocarbon groups, derived from secondary amines, these hydrocarbon groups may be the same or they may be different. In addition, the radical

can be a heterocyclic group, derived from a heterocyclic secondary amine, wherein N is a member of the ring as in the piperidyl and the morpholyl groups.

Thus, the Y—N— radical can be derived from ammonia or such representative amines as methyl amine, ethyl amine, n-propyl amine, isopropyl amine, n-butyl amine, isobutyl amine, n-amyl amine, n-hexyl amine, dimethyl amine, diethyl amine, di-n-propyl amine, di-isopropyl amine, di-n-butyl amine, di-isobutyl amine, di-amyl amines, cyclohexyl amine, dicyclohexyl amine, ethyl cyclohexyl amine, aniline, benzyl amine, phenethyl amine, toluidines, N-ethyl aniline, N-cyclohexyl aniline, diphenyl amine, and alpha and beta naphthyl amines. Preferably, the radical

when derived from an amine contains in addition to the amino nitrogen atom only atoms of carbon and hydrogen and contains 1 to 12 carbon atoms.

$R_1$ in the general formula of the O-alkyl thiocarbamates is the radical derived from the alcohol which was employed to make the xanthogenic acid derivative used as a reactant in the preparation of the O-alkyl thiocarbamate. Thus, $R_1$ is an alkyl hydrocarbon group and is preferably an alkyl hydrocarbon group containing 1 to 8 carbon atoms.

Typical specific O-alkyl thiocarbamates which can be employed in preparing the biologically-active compositions of this invention are O-ethyl thiocarbamate (in which

is NH₂), O-methyl N,N-dimethyl thiocarbamate, O-methyl N,N-diethyl thiocarbamate, O-ethyl N,N-dimethyl thiocarbamate, O-isopropyl N,N-dimethyl thiocarbamate, O-isopropyl N,N-diethyl thiocarbamate, O-isopropyl N,N-diisopropyl thiocarbamate, O-isooctyl N,N-dimethyl thiocarbamate, O - isopropyl piperidyl thiocarbamate, O-ethyl morpholyl thiocarbamate, O-methyl N - cyclohexyl thiocarbamate, O - isopropyl N-phenyl thiocarbamate, and O-methyl N-benzyl thiocarbamate among others.

When these O-alkyl thiocarbamates are dispersed in an inert carrier such as an aqueous solution of a dispersing or wetting agent, or a powdered inert solid such as diatomaceous earth, in concentrations as low as 10 parts per million, the resulting compositions have been found to be useful as fungicides and plant growth regulants. Similar compositions containing higher concentrations of the O-alkyl thiocarbamates are useful as fungicides, insecticides and plant growth regulants. Because these O-alkyl thiocarbamates possess the unusual property of fuming in the presence of moist air, they can also be used as fumigants in combating fungi and insects, for example, in fumigation of grain, fruit and plants, and at low concentrations of about 3 to 10 parts per million parts of moist air, they find considerable use as cell-proliferants especially in stimulating the formation of calluses and roots on plant cuttings.

The following specific examples demonstrate the diverse biological activity of these O-alkyl thiocarbamates and illustrate their use as active ingredients in various biologically-active compositions. Although O - isopropyl N,N - diethyl thiocarbamate is the specific O-alkyl thiocarbamate referred to in the following examples, other members of this class of compounds including O-methyl dimethyl thiocarbamate, O-methyl diethyl thiocarbamate, O-ethyl dimethyl thiocarbamate, O-ethyl diethyl thiocarbamate and O-isopropyl dimethyl thiocarbamate were likewise tested, and were found to possess the same properties; accordingly the examples are to be read as referring to any of these O-alkyl thiocarbamates.

EXAMPLE I

The insecticidal activity of compositions containing O-alkyl thiocarbamates was determined by two tests. In the first test compositions containing the O-alkyl thiocarbamate were sprayed on bean foliage after which Mexican bean beetles (adult and larvae) and Japanese beetles (adult and larvae) were placed on the treated foliage, and cages were placed over the foliage to confine the insects to the treated plants. In the second test, live and vigorous Mexican bean beetles and Japanese beetles, adult and larvae of both insects, were immersed for 30 seconds in aqueous dispersions containing the O-alkyl thiocarbamates and a wetting agent. The insects so treated survived this immersion treatment. These insects were placed on untreated bean foliage and confined there. Live and vigorous beetles were dipped into an aqueous solution of the wetting agent used in the second test and then placed on untreated bean foliage and confined there as a control test.

When an aqueous dispersion containing 0.5% by weight of O-isopropyl N,N-diethyl thiocarbamate and 0.125% by weight of sodium lauryl sulfate as the dispersing or wetting agent was employed in the first of the described tests, it was found that the residual spray deposit on the bean foliage killed the adult and larvae of both the Mexican bean beetle and the Japanese beetle in 24 hours. All of the beetles, both adult and larvae, immersed in the aqueous dispersion in the second test were dead in 24 hours. However, the beetles, adult and larvae, which had been immersed in the aqueous solution of sodium lauryl sulfate were alive and vigorous 24 hours after such treatment. These tests indicate that the O-alkyl thiocarbamates are stomach poisons as well as contact poisons.

EXAMPLE II

To determine whether or not the O-alkyl thiocarbamates possess fungicidal activity they were tested against the fungi Alternaria solani and Sclerotinia fructicola in the standard Agar plate test. Various concentrations of the O-alkyl thiocarbamates were incorporated into an aqueous mixture of Difco Malt Extract Agar, these Agar compositions were poured into sterilized Petri dishes and then inoculated by spraying some with spore suspensions of Alternaria solani and others with spore suspensions of Sclerotinia fructicola. Then these inoculated treated nutrients were incubated at 21° C. for 3 days. The Agar was then inspected to determine whether or not the active ingredient had prevented spore germination and to what degree spore germination had been prevented. In this manner it was found that O-isopropyl, N,N-diethyl thiocarbamate at a concentration of 100 p. p. m. (0.01%) in the Agar composition permitted none of spores of the two fungi to germinate.

EXAMPLE III

Having determined in the laboratory that the O-alkyl thiocarbamates have fungicidal activity, additional tests were carried out under conditions which would be present in actual use. In a series of tests with moist grain, some of the grain which had just been harvested was fumigated with O-isopropyl N,N-diethyl thiocarbamate by mixing this compound with the grain as it was unloaded into storage bins. About one per cent by weight of the O-alkyl thiocarbamate was mixed with the grain. Another portion of the grain was stored untreated. In about a week the untreated grain had begun to ferment, but there was no fermentation in the grain treated with O-isopropyl N,N-diethyl thiocarbamate. It is thus apparent that sterilization of grains or other culture media may be effected at ordinary temperatures by fumigation with O-alkyl thiocarbamates. This is more desirable than heat-sterilization since the latter destroys many metabolites or food factors essential to the growth of obligate parasites and related pathogens.

EXAMPLE IV

In another series of tests using apple slices, there was added to quart canning jars sufficient O-isopropyl N,N-diethylthiocarbamate to give a concentration of the vapors of this compound of 1 part per 11,900 parts of air by volume in the jar after which freshly sliced portions of apples, inoculated with decaying apple tissue were placed in the jars and the jars sealed. Three weeks later the apple slices were free from decay. Thus, storage bins of fruit such as apples, oranges, and of tubers such as potatoes may be treated with O-alkyl thiocarbamates to retard the growth of microorganisms responsible for spoilage by rotting and molding.

The O-alkyl thiocarbamates were also found to be plant growth regulants. The following examples illustrate the ability of these compounds to change the growth of plant cells.

EXAMPLE V

An aqueous dispersion of O-isopropyl N,N-diethyl thiocarbamate was prepared containing 100 p. p. m. of this compound and 0.0125% of sodium lauryl sulfate as a dispersing agent. Four tomato plants and six bean plants 3 to 6 inches high in flats in a greenhouse maintained at 75° F. were sprayed with this aqueous dispersion. After four days a slight response by the tomato plants was evidenced by the presence of stem curvature. On the fifth day the plants were sprayed again. On the seventh day both the bean and tomato plants displayed curvature and leaf deformity. On the eleventh day the plants were sprayed again. By the thirteenth day root primordia were very prominent along the stems on all plants, there was marked nastic response as indicated by the curvature of the plant stems and there was considerable leaf deformity. But none of these plants died. This indicates a lack of phytotoxicity for this class of compounds at the concentrations desired for application.

EXAMPLE VI

Twenty-eight four inch terminal cuttings of Pachysandra were dipped into an aqueous dispersion containing 10 p. p. m. of O-isopropyl N,N-diethyl thiocarbamate and 28 similar cuttings were dipped into a similar aqueous dispersion containing 100 p. p. m. of the same thiocarbamate. Each dispersion also contained 0.25% sodium lauryl sulfate as a dispersing agent. About two inches of these treated cuttings were placed in moist sand. The cuttings were watered the following day and daily thereafter. Twenty-eight similar cuttings dipped into an aqueous solution containing 0.25% sodium lauryl sulfate only, were likewise placed in moist sand and watered the following day and daily thereafter. In all 84 Pachysandra cuttings were used. After 25 days in moist sand 20 of the cuttings treated with the aqueous dispersion containing 10 p. p. m. of O-isopropyl N,N-diethyl thiocarbamate were heavily rooted and the remaining 8 cuttings which had not at that time rooted also had not rotted. Of the 28 treated with the 100 p. p. m. aqueous dispersion, 15 were heavily rooted and the remaining 13 cuttings which had not as yet rooted also had not rotted. Of the 28 cuttings treated with the aqueous solution of the wetting agent 2 had rotted, 9 had not rooted and the remainder were just beginning to send out a few roots.

EXAMPLE VII

Three aqueous compositions were employed to treat holly, *Ilex opaca*, cuttings. One composition contained 10 p. p. m. of O-isopropyl N,N-diethyl thiocarbamate and 0.25% by weight of sodium lauryl sulfate as the dispersing agent. The second composition contained 100 p. p. m. of O-isopropyl N,N-diethyl thiocarbamate and 0.25% by weight of sodium lauryl sulfate. The third composition contained only 0.25% by weight of sodium lauryl sulfate. Nine four inch terminal holly cuttings were treated with each aqueous composition and then all 27 cuttings were placed in moist sand with about two inches of the cutting projecting above the sand. The cuttings were watered daily starting the day after placing them in the moist sand. Twenty-five days after the cuttings had been treated as described above, all the cuttings were removed from the sand and were examined. Seven of the cuttings treated with the aqueous composition containing 10 p. p. m. of the O-alkyl thiocarbamate had rooted. Six of the cuttings treated with the aqueous composition containing 100 p. p. m. of the O-alkyl thiocarmabate had rooted. Four of the cuttings treated with the aqueous solution of the dispersing agent had rotted but none had rooted.

EXAMPLE VIII

The same aqueous compositions employed in Examples VI and VII containing the O-alkyl thiocarbamate were used to treat Chrysanthemum cuttings. Thirty cuttings, fifteen four inch cuttings in each group, were treated with each aqueous composition containing the O-alkyl thiocarbamate. The cuttings were placed in moist sand and watered as hereinbefore described. After 25 days the cuttings were removed from the sand and examined. Eleven of the cuttings treated with the aqueous composition containing 10 p. p. m. of O-isopropyl N,N-diethyl thiocarbamate had heavy root growth and 10 of the cuttings treated with the aqueous composition containing 100 p. p. m. of the O-alkyl thiocarbamate had heavy root growth.

Many of the harder woody plant cuttings are extremely difficult to root. In addition the formation of the protective callus on the cut portion of such plant cuttings is so slow that microorganisms enter the cut before the callus layer is formed with the result that the cutting rots. Because of this, the cutting never roots. If the callus formation could be speeded up, it might be possible to promote rooting of such cuttings. I have found that O-alkyl thiocarbamates promote the callusing of woody plant cuttings. The following examples wherein cuttings from apple trees were employed illustrate the ability of the O-alkyl thiocarbamates to promote callusing of hard woody cuttings.

EXAMPLE IX

Cuttings were taken in the month of March from twelve year old apple trees of the variety McIntosh. Only branches with a vigorous growth of more than six inches during the previous year were used. The twigs were cut, for each year's growth, into sections three to four inches long. These cuttings were used in two series of tests.

In the first series of tests twenty cuttings of the one year old wood carrying the terminal bud were immersed cut end down for five minutes to a depth of about one inch from the bud in an aqueous composition containing 400 p. p. m. (0.04% by weight) of O-isopropyl N,N-diethyl thiocarbamate and 0.0125% by weight of sodium lauryl sulfate as the dispersing agent. Twenty sub-terminal cuttings of first year growth were similarly dipped in the same solution. Twenty terminal and twenty sub-terminal first year growth were similarly immersed in water solution containing 0.0125% sodium lauryl sulfate as a control. All eighty of these treated cuttings were then placed in moist sand and watered daily beginning the day after placing them in the moist sand. Six weeks later these cuttings were removed from the moist sand and examined. It was found that 10% of the first year terminal cuttings had callused and 30% of the first year sub-terminal cuttings had callused. There was no callusing of the first year terminal cuttings in the control and only 10% of the sub-terminal cuttings had callused in the control.

EXAMPLE X

Two hundred and forty apple twig cuttings, secured as described in Example IX, were employed in a series of tests to determine the ability of O-alkyl thiocarbamates to promote callus formation by subjecting the cuttings to the vapors of the thiocarbamate. One hundred and twenty cuttings consisting of 20 cuttings of each of first year terminal wood, first year sub-terminal wood, second year terminal wood, second year sub-terminal wood, third year wood, and fourth year wood were placed in a bell jar also containing a pad moistened with water. A small amount of O-isopropyl N,N-diethyl thiocarbamate sufficient to give a concentration of one part by volume for 160,000 parts by volume of air in the bell jar was placed therein. An aspirating pump was connected to the bell jar to create only a slightly reduced pressure in the jar to hasten the fuming of the O-alkyl thiocarbamate. Then the pump was disconnected from the bell jar and the cuttings were allowed to be in contact with the thiocarbamate fumes in the moist chamber for 48 hours. One hundred and twenty apple cuttings, 20 each of the six groups above named, were treated in a similar manner with one part by volume of O-isopropyl N,N-diethyl thiocarbamate fumes for 272,000 parts of air by volume. All the the cuttings so treated were placed in moist sand and watered daily for two weeks.

After the two weeks in the moist sand, all the cuttings were removed and examined for callus formation. The results of these two series of tests are tabulated below in Table I.

*Table I.—Callusing test of apple twig cuttings var. McIntosh; twigs treated with vapors of O-isopropyl N,N-diethyl thiocarbamate*

| Concentration | Type of Twig Cutting | Percent Callused |
|---|---|---|
| 1:160,000 (6.25 p. p. m.) | 1 yr. old wood, terminal cut | 80 |
| | 1 yr. old wood, sub-terminal cut | 100 |
| | 2 yr. old wood, terminal cut | 30 |
| | 2 yr. old wood, sub-terminal cut | 0 |
| | 3 yr. old wood | 10 |
| | 4 yr. old wood | 85 |
| 1:272,000 (3.68 p. p. m.) | 1 yr. old wood, terminal cut | 60 |
| | 1 yr. old wood, sub-terminal cut | 100 |
| | 2 yr. old wood, terminal cut | 40 |
| | 2 yr. old wood, sub-terminal cut | 60 |
| | 3 yr. old wood | 15 |
| | 4 yr. old wood | 70 |

EXAMPLE XI

Additional tests making use of the cell-proliferation properties of the O-alkyl thiocarbamates were carried out. In these tests the O-alkyl thiocarbamate was dispersed in an aqueous solution containing one ounce, 0.007% by weight, of a dispersing agent containing mainly sodium oleyl sulfate with a minor amount of a synthetic resinous sticker. These compositions were sprayed on apple trees, var. Blaxtayman, after blossoming during the calyx stage. Each composition was sprayed on five individual trees. The purpose of these tests was to determine whether or not O-alkyl thiocarbamates would promote the cell growth in the abscission layer of the fruit stem and cause a portion of the set fruit to be dropped. The results of these tests were checked against the number of fruit on hand thinned trees and trees which had no hand thinning and no chemical treatment to induce the reduction of set fruit. The results of these tests are tabulated below in Table II. The number of fruit is that remaining after the June drop.

*Table II.—Thinning of fruit on apple trees var. Blaxtayman*

| Experiment | Composition | Number of Fruit per 100 Spurs |
|---|---|---|
| A | 10 p. p. m. O-isopropyl N,N-diethyl thiocarbamate and 0.007% by weight of dispersing agent. | 49 |
| B | 20 p. p. m. O-isopropyl N,N-diethyl thiocarbamate and 0.007% by weight of dispersing agent. | 50 |
| C | Check—no treatment | 80 |
| D | Hand thinning | 61 |

EXAMPLE XII

A similar experiment was carried out on peach trees. An aqueous composition containing 20 p. p. m. of O-isopropyl N,N-diethyl thiocarbamate and 0.0125% by weight of sodium lauryl sulfate was sprayed on peach trees. An aqueous solution of 0.0125% by weight of sodium lauryl sulfate was sprayed on different peach trees in the same orchard. The number of blossoms on all of the trees treated were counted before spraying. A count of the set fruit on these treated trees was made on June 10. The trees treated with the aqueous spray containing only the dispersing agent had 35 set fruit per 100 blossoms. The trees treated with the aqueous spray composition containing the O-alkyl thiocarbamate and the dispersing agent had 25 set fruit per 100 blossoms. Trees which had not been treated to reduce the set fruit had 40 fruit per 100 blossoms. By hand thinning, the average set fruit was 25 per 100 blossoms.

Hand thinning of set fruit has been a necessary procedure in orchards where self pollinating varieties of fruit produce a high percentage of set fruit. If all the set fruit would be allowed to remain on the trees, the weight of the growing fruit would cause the branches of the trees to break thereby injuring the trees. Also, if all the set fruit would be allowed to remain on the tree, the mature fruit would be small in size and would not bring as high a market price as would the larger premium size fruit. It is readily apparent that hand thinning the set fruit is expensive. Hand thinning inexpertly done also results in damage to the fruit spurs. Examples XI and XII demonstrate that O-alkyl thiocarbamates stimulate the growth of the abscission cells in some of the stems of the set fruit resulting in a natural dropping of the fruit, thereby accomplishing the desired results without injury to the fruit spur.

Although the specific examples hereinbefore set forth describe the use of O-alkyl thiocarbamates in concentrations less than 1% by weight, compositions containing higher concentrations of O-alkyl thiocarbamates can be employed. For example, compositions containing up to 10% by weight of these O-alkyl thiocarbamates can be employed to combat insects and fungi. Also such compositions can be employed in mist type spray equipment to reduce the set fruit on fruit trees because the mist type sprayers uniformly deposit such a small amount of the higher concentrations on the trees. Thus, the concentration of the active ingredient will vary with the type of equipment being employed to apply formulations containing the O-alkyl thiocarbamates.

The use of the specific dispersing agent sodium lauryl sulfate is not at all critical in preparing useful aqueous compositions containing O-alkyl thiocarbamates. Suitable aqueous compositions can be prepared by dissolving the O-alkyl thiocarbamate in a small amount of a water-miscible solvent such as alcohol or acetone and combining this solution with sufficient water to obtain the desired concentration of the active ingredient. The O-alkyl thiocarbamate can also be dissolved in a small amount of a hydrocarbon such as insecticide grade kerosene and this hydrocarbon solution then dispersed in water with the aid of a surface active agent to give an oil in water dispersion. Satisfactory wetting or dispersing agents which may be employed to prepare aqueous spray compositions of this invention may be selected from the following classes of wetting and dispersing agents: sodium and potassium salts of fatty acids known as soft and hard soaps; water-soluble salts of disproportionated abietic acid known as rosin soaps; water-soluble salts of the hydroxy aldehyde acids present in seaweed known as algin soaps; alkali-casein compositions; water-soluble lignin sulfonate salts; long chain alcohols usually containing 10 to 18 carbon atoms; water-soluble salts of sulfated fatty alcohols containing 10 to 18 carbon atoms; water-soluble salts of sulfated fatty acid amides; water-soluble esters of sulfated fatty acids; water-soluble alkyl sulfonates having on the average of 16 carbon atoms in the alkyl group; water-soluble aryl sulfonates; water-soluble alkyl aryl sulfonates; water-soluble aralkyl sulfonates; water-soluble sorbitan mono-laurate, -palmitate, -stearate, and -oleate; and others. These dispersing and wetting agents are sold under numerous trade names and may be either pure compounds or mixtures of compounds of the same general group.

The amount of dispersing or wetting agent employed will depend on the activity and efficiency of the dispersing or wetting agent employed. In general, from about 0.001% by weight of the more active to 5% by weight of the less active dispersing or wetting agents will be found to be satisfactory for the preparation of most aqueous compositions.

The O-alkyl thiocarbamates can also be dispersed with finely-divided pulverulent solid materials such as talc, calcium carbonate, tricalcium phosphate, clays and diatomaceous earths to produce useful insecticidal and fungicidal dust compositions.

There may be combined with the dispersions of O-alkyl thiocarbamates other fungicidal and insecticidal materials such as rotenone, metallic arsenicals, fluosilicates, organic thiocyanates, phenothiazine, nicotine, pyrethrum and the like to prepare general purpose horticultural and pesticidal compositions. Stickers or adhesives may also be included in the composition, if desired.

While I have disclosed specific examples of my invention, I do not thereby desire or intend to limit myself solely thereto, for as hereinbefore stated the precise proportions of the active ingredients may be varied and other members of the class of active ingredients herein described may be employed if desired, without departing from the spirit and scope of my invention as described in the appended claims.

I claim:
1. A composition useful for insecticidal and fungicidal purposes and for altering the growth of plants comprising, as the essential active ingredient, from 3 p. p. m. to 10% by weight of an O-alkyl N,N-dialkyl thiocarbamate and a carrier therefor, said active ingredient being uniformly dispersed throughout the mass of the carrier.

2. A composition useful for insecticidal and fungicidal purposes and for altering the growth of plants which comprises as the essential active ingredient from 3 p. p. m. to 0.5% by weight of O-isopropyl N,N-diethyl thiocarbamate dispersed in an aqueous medium.

3. In the propagation of plants the method of protecting the plants from insects and fungi which comprises applying to the plants a composition containing from 10 p. p. m. to 0.5% by weight of O-isopropyl N,N-diethyl thiocarbamate.

4. In the propagation of plants the method of stimulating plant cell growth which comprises treating the plants with a composition containing 3 p. p. m. to 0.5% by weight of O-isopropyl N,N-diethyl thiocarbamate.

5. In the propagation of plants the method of stimulating root growth which comprises subjecting plant cuttings to fumes of O-isopropyl N,N-diethyl thiocarbamate in moist air where the concentration of O-isopropyl N,N-diethyl thiocarbamate in the moist air is 3 p. p. m. to 10 p. p. m.

6. The method of protecting plant products from insects and fungi which comprises fumigating said products with vapors of O-isopropyl N,N-diethyl thiocarbamate.

7. In the propagation of plant life the method of protecting the health of the plant as well as inducing new cell growth which comprises applying to at least a portion of the plant structure a composition containing as its essential active ingredient from 3 p. p. m. to 10% by weight of an O-alkyl N,N-dialkyl thiocarbamate.

WILLIAM D. STEWART.

References Cited in the file of this patent

UNITED STATES PATENTS

| Number | Name | Date |
|---|---|---|
| 2,535,877 | Stewart | Dec. 26, 1950 |

FOREIGN PATENTS

| Number | Country | Date |
|---|---|---|
| 579,597 | Germany | June 28, 1933 |

OTHER REFERENCES

Berichte der Deutsche Chem. Gesell., vol. 43, pages 1853–1857.

Berichte der Deutsche Chem. Gesell., vol. 64B, pages 661–667 (1931).

Bichemical Journal, vol. 40 (1946), pages 331–334.

Biochemical Journal, vol. 43 (1948), pages 461–467.

Botanical Gazette, vol. 107 (1946), pp. 475–507.

Proc. Amer. Horticultural Society, vol. 47 (1946), pages 522–524.